(12) United States Patent
Schmid

(10) Patent No.: US 7,334,374 B2
(45) Date of Patent: Feb. 26, 2008

(54) STUCCO SHEATHING FASTENER

(76) Inventor: Ben L. Schmid, 203 Pearl Ave., Balboa Island, CA (US) 92662

( * ) Notice: Subject to any disclaimer, the term of this patent is extended or adjusted under 35 U.S.C. 154(b) by 0 days.

(21) Appl. No.: 10/211,790

(22) Filed: Aug. 2, 2002

(65) Prior Publication Data

US 2003/0024198 A1 Feb. 6, 2003

Related U.S. Application Data

(60) Provisional application No. 60/309,802, filed on Aug. 3, 2001.

(51) Int. Cl.
*E04B 9/00* (2006.01)
*E04F 13/04* (2006.01)

(52) U.S. Cl. ............................ 52/361; 52/362; 52/363; 411/399; 411/411; 411/424

(58) Field of Classification Search ............... 52/481.1, 52/361, 362, 363, 699, 698, 705, 706–708, 52/712; 411/542, 368, 370, 369, 371.1, 371.2, 411/915, 399, 411, 424
See application file for complete search history.

(56) References Cited

U.S. PATENT DOCUMENTS

| | | | | |
|---|---|---|---|---|
| 429,241 A | * | 6/1890 | Julian et al. ................ 411/399 |
| 4,074,501 A | * | 2/1978 | Sandqvist ................... 52/741.4 |
| 4,780,039 A | * | 10/1988 | Hartman ...................... 411/531 |
| 5,003,743 A | * | 4/1991 | Bifano et al. ............... 52/288.1 |
| 5,188,495 A | * | 2/1993 | Jones, Jr. ..................... 411/369 |
| 5,199,839 A | * | 4/1993 | DeHaitre .................. 411/387.3 |
| 5,201,627 A | * | 4/1993 | Biedenbach ................ 411/531 |
| 5,555,698 A | * | 9/1996 | Mandish ................... 52/745.17 |
| 5,711,711 A | * | 1/1998 | Schmidt, Jr. .................. 470/41 |
| 5,732,520 A | * | 3/1998 | Maietta ...................... 52/483.1 |
| 6,095,081 A | * | 8/2000 | Gochenour ................. 116/209 |
| 6,494,972 B1 | * | 12/2002 | Keener et al. .............. 148/529 |
| 6,565,303 B1 | * | 5/2003 | Riccitelli et al. ........... 411/533 |
| 6,668,501 B2 | * | 12/2003 | Adebar et al. ................ 52/363 |

OTHER PUBLICATIONS

Hawley's Condensed Chemical Dictionary, Richard J. Lewis, Sr., 1997, John Wiley & Sons, Inc., 13, 782.*

* cited by examiner

*Primary Examiner*—Jeanette Chapman
(74) *Attorney, Agent, or Firm*—Christie, Parker & Hale, LLP.

(57) ABSTRACT

A fastener including a body having a predetermined axial length, wherein the body includes a screw head at one axial end of the body, a threaded portion at an opposite axial end of the body and an unthreaded shank portion extending between the screw head and the threaded portion, and wherein the shank portion has an axial length in excess of at least one-third of the axial length of the fastener body.

3 Claims, 3 Drawing Sheets

STUCCO SHEATHING FASTENER

CROSS-REFERENCE TO RELATED APPLICATION(S)

This application claims priority under 35 U.S.C. §119(e) to U.S. Provisional Application Ser. No. 60/309,802, filed Aug. 3, 2001. The application is also related to U.S. Pat. No. 6,928,778 and U.S. Pat. No. 6,907,699 and U.S. patent application Ser. No. 10/211,810 filed on even date herewith, each of which is incorporated by reference.

FIELD OF THE INVENTION

The present invention is related to a fastener for stucco sheathings, and more particularly, to a screw for retrofitting existing stucco, which is attached to the exterior of a building frame, to improve the resistance of the stucco to shearing forces caused by seismic and hurricane lateral loading.

BACKGROUND

As observed, reported and learned from nine California earthquakes since 1951, existing Portland cement-based exterior plaster (stucco) of wooden-framed structures has had little success in surviving intense lateral loads caused by earthquake, as well as hurricane forces. For example, the shaking intensity during the 1994 Northridge Earthquake, which in some locations reached magnitudes of 8 and 9 Modified Mercalli Intensity (MMI), was enough to detach stucco sheathings from the wooden frame of many one and two story single family residences and apartment buildings. Such detachment of the stucco sheathings from the wood framing resulted in heavy interior damage, uninhabitable structures and required the removal and replacement of the stucco sheathings.

A primary reason for the detachment of the stucco from the wood framing was the Uniform Building Code's approval of staples, since 1957, for attaching a reinforcing wire mesh to the wood framing prior to applying the stucco over the wire mesh coupled with the requirement of the Uniform Building Code in 1967 that a 26 gauge corrosion resisting continuous drip screed be installed against the mud sill plate, which is disposed along the lower portion of the wood framing. The mud sill plate has a minimum of a one inch overlap below the wood sill plate. The continuous drip screed is typically attached to the mud sill by the use of nails so that the stucco ends evenly just below the mud sill. Waterproof building paper and wire mesh or metal lath are then installed over the drip screed.

The wire mesh or metal lath is normally attached to the metal drip screed by use of the Uniform Building Code's specified staples, which are typically applied by use of a staple gun. Many times, the staple legs become bent and do not penetrate the metal drip screed. Staples used to fasten the wire mesh at the drip screed are often rusted out within a few years due to moisture rusting and weakening the thin staple legs. Stucco having poor lateral attachment to the mud sill due to unattached or rusted staples, typically fails at the wood sill plate during intense lateral displacement of the wood framing generated by such forces as earthquakes and/or hurricanes. Failure of the stucco sheathing generally results in heavy structural damage, often leaving the structure uninhabitable and needing complete replacement of the exterior stucco sheathing.

More recently, particularly in structures built after 1994, home builders have had limited success in improving the structural strength of the stucco sheathings by using furring nails to reinforce the wire mesh to the wood framing. Such nails are the subject of U.S. Pat. No. 1,517,035, wherein the head of the nail and a spacer concentrically disposed around the nail are configured to both retain the wire mesh and maintain the wire mesh at a distance apart from the underlying structure, or building paper, when the nail is driven into place within the framing. However, the use of such furring nails is labor intensive and cannot be retrofitted to strengthen existing stucco wall sheathings.

Therefore there is a need for a device and method of improving the strength of existing stucco sheathing against intense lateral forces, which is inexpensive and easily retrofitted to existing stucco sheathings.

SUMMARY OF THE INVENTION

An exemplary embodiment of the present invention includes a fastener comprising a body having a predetermined axial length, wherein the body comprises a screw head at one axial end of the body, a threaded portion at an opposite axial end of the body and an unthreaded shank portion extending between the screw head and the threaded portion, and wherein the shank portion has an axial length in excess of at least one-third of the axial length of the fastener body.

Another exemplary embodiment of the present invention includes a building structure comprising a building frame, one or more layers of stucco sheathing and a plurality of fasteners for securing a predetermined portion of the stucco sheathing to the building frame, wherein each fastener comprises a body of a predetermined axial length having a screw head at one axial end of the body, a threaded portion at an opposite axial end of the body, and an unthreaded shank portion extending between the screw head and the threaded portion, wherein the shank portion has an axial length in excess of at least one-third of the axial length of the fastener body.

A further embodiment of the present invention includes a method of improving a lateral resistance of a stucco sheathing that is attached to a building frame. The method comprises providing a building frame, providing one or more layers of stucco sheathing and drilling a plurality of holes, wherein each hole extends through the stucco sheathing and into the building frame. A corresponding fastener is provided for each drilled hole, wherein each fastener comprises a body of a predetermined axial length having a screw head at one axial end of the body, a threaded portion at an opposite axial end of the body, and an unthreaded shank portion extending between the screw head and the threaded portion, wherein the shank portion has an axial length in excess of at least one-third of the axial length of the fastener body. The plurality of fasteners are installed in each corresponding drilled hole to secure the stucco sheathing to the building frame.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION

Figure 1:
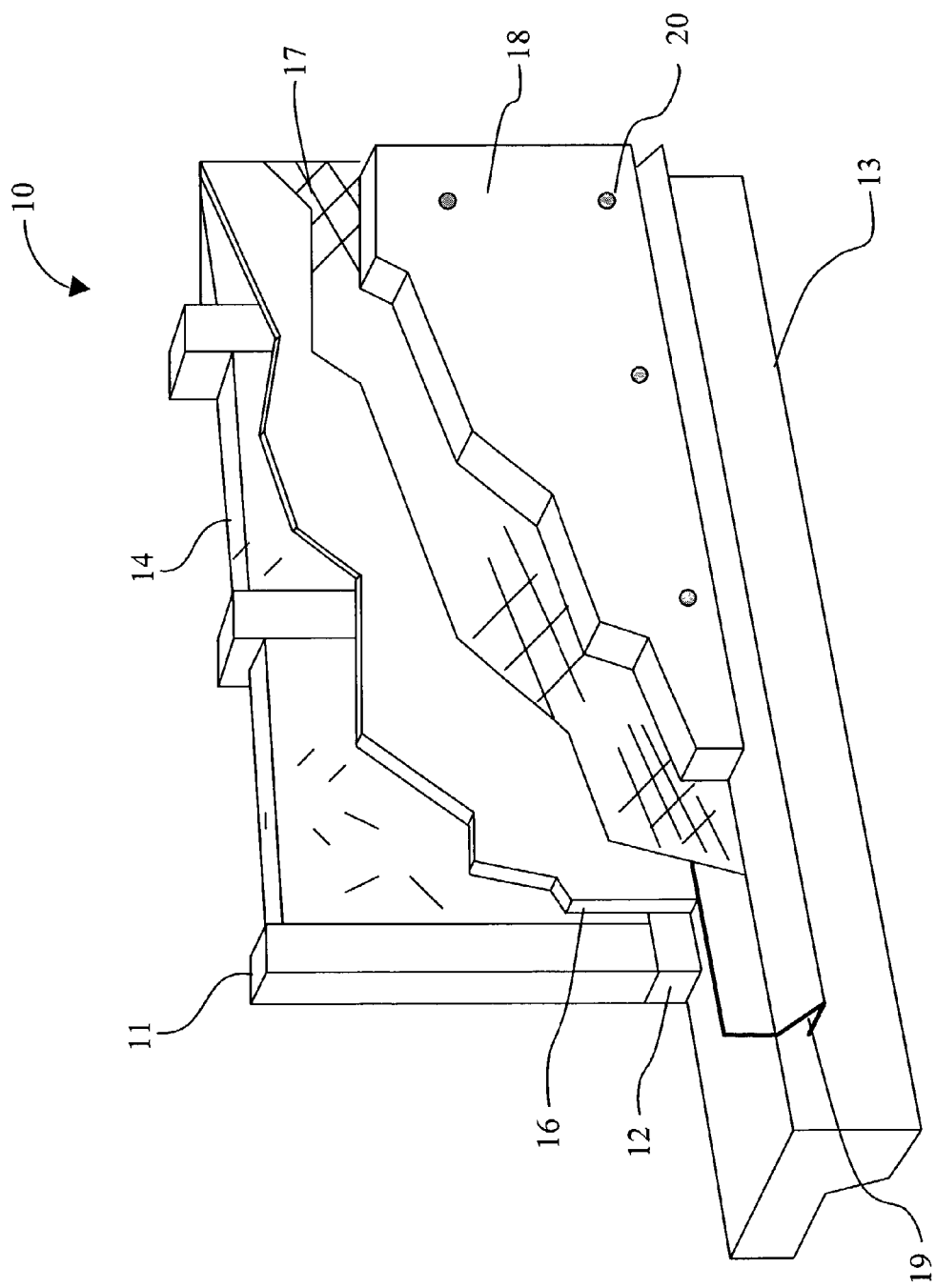
FIG. 1 is a partial perspective view of an exterior wall plate of a typical wood framing.

The present invention is generally related to a fastener for a stucco sheathing, which is attached to a building frame, to improve a lateral resistance of the stucco sheathing. The fastener may be used to retrofit to an existing stucco sheathing to improve lateral and shear load resistance of the existing stucco sheathing to earthquakes or other forces. As shown in FIG. 1, a typical building structure or structural frame 10 comprises a series studs 11, such as 2×4 or 2×6 wooden studs, a sill plate 12, such as a wooden sill plate, as well as window jambs and door jambs, among other structures (not shown). The frame 10 is anchored to a building foundation 13, such as an on-grade concrete slab, by being anchored to the sill plate 12, which is in turn anchored to the foundation 13, by bolts. Insulation 14 is typically disposed between the studs 11 to thermally "proof" the structure 10.

Building paper 16, such as waterproof building paper, and a metal lath or wire mesh 17 are generally attached to the frame 10 by fasteners, for example, staples or furring nails, before a stucco sheathing 18 is applied over the wire mesh 17 as an exterior finish to the frame 10. Typically, the stucco sheathing 18 is applied over the wire mesh 17, such that bonding occurs between stucco sheathing 18 and the wire mesh 17. The stucco sheathing 18 may be applied in several coats, such as three coats.

A drip screed 19 may be installed between the building frame 10 and stucco sheathing 18, for example, at a base of the frame 10. The drip screed 19 helps prevent moisture from entering the juncture of the bottom of the frame 10 and the foundation 13.

A fastening device or fastener 20, such as a screw fastener, may be inserted through the stucco sheathing 18 and into the frame 10 to maintain the structural integrity and enhance the lateral strength of the stucco sheathing 18. The fastener 20 may be installed to retrofit existing stucco sheathings. The fastener 20 is specially designed to transfer shearing loads from the stucco sheathing 18 to the frame 10, which transfers the shearing forces to the sill plate 12 and the building foundation 13 during sudden intense lateral movement, such as that generated by seismic and/or hurricane forces. As a result, the stucco sheathing 18 will resist greater lateral loads and experience less lateral displacement prior to failure.

Figure 2:
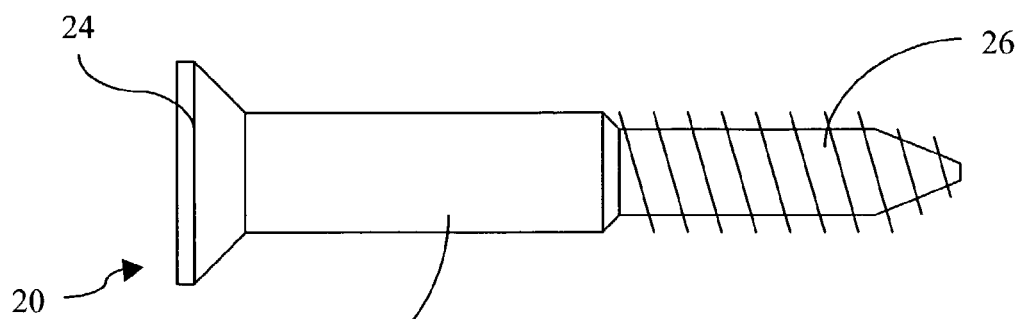
FIG. 2 is a side view of a first embodiment of a fastener of the present invention.

In one embodiment, as shown in to FIG. 2, the fastener 20 is a shear screw having a screw head 24 at one axial end and a threaded portion 26 at an opposite axial end. The screw head 24 is generally tapered inwardly. For example, the screw head 24 may taper from a diameter of approximately 3/8 inches to a diameter of approximately 3/16 inches to form a countersunk screw head. However, the screw head 24 may comprise other suitable constructions as well. In one embodiment, the screw head 24 is adapted for removable engagement with a socket wrench (See FIG. 5). For example, the screw head 24 may be hexagonally shaped, such that a 3/8 inch socket wrench may be removably coupled thereto. Alternatively, the screw head 24 may be slotted to receive a phillips head or slot head screw driver.

In the depicted embodiment of FIG. 2, an unthreaded shank portion 28 is disposed between the screw head 24 and the threaded portion 26. The shank 28 may axially extend to any suitable length so long as the axial length of the shank 28 is in excess of at least one-third of the total axial length of the fastener 20. In one embodiment, the shank 28 axially extends approximately one-half the total axial length of the fastener 20. For example, in one embodiment the fastener 20 is approximately 2¼ inches in axial length and the shank 28 is approximately 3/16 inches in diameter and axially extends approximately 1⅛ inches from the screw head 24. In this embodiment, the threaded portion 26 also has a diameter of approximately 3/16 inches.

The fastener 20 may be comprised of any one of a variety of suitable materials. For example, the fastener 20 may be comprised of a metal material, such as a 300 Series non-heat treated, stainless steel wire stock. The fastener 20 may also be normalized to increase the ductility of the fastener material to enable the fastener 20 to better endure the back and forth forces of the stucco sheathing 18 against the frame 10 during earthquakes and/or hurricanes. In addition, the fastener 20 may be electroplated to galvanize the fastener 20.

Figure 3:
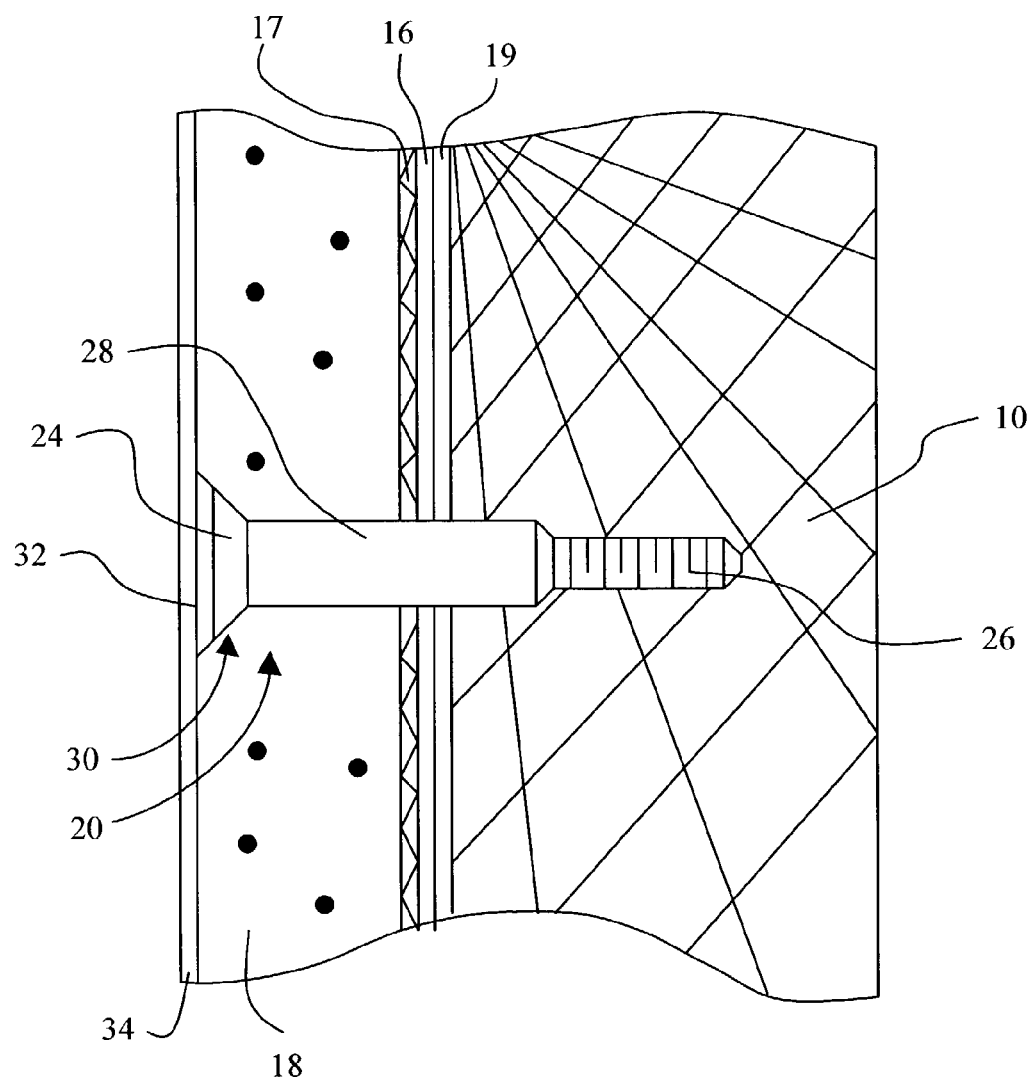
FIG. 3 is a side cross-sectional view of the fastener of FIG. 2 installed into the exterior wall plate of FIG. 1.

In one embodiment, as shown in FIG. 3, the axial length of the shank 28 is such that the shank 28 extends through the stucco sheathing 18, the wire mesh 17, the building paper 16, the drip screed 19 (where applicable), and at least partially into the frame 10. This design allows the shank 28 to engage the frame 10 to transfer shear forces, such as seismic shear forces experienced by the stucco sheathing 18, to the frame 10, which transfers the shearing forces to the sill plate 12 and the building foundation 13. This maintains the structural integrity of the exterior stucco sheathing 18 and interior wall sheathing during high intensity earthquake and/or hurricane forces and increases the shear resistance provided by the stucco sheathing 18 and results in less deflection of the stucco sheathing 18 prior to failure. In addition, since the shank portion 28 is not threaded, less damage is done to the stucco sheathing 18 when the stucco sheathing 18 experiences shear forces than is done by use of a threaded shank, which tends to cut into the stucco sheathing 18 when the stucco sheathing 18 experiences shear forces.

A method of use of the fastener 20 comprises drilling a hole 30, such as a countersunk pilot hole (shown in FIGS. 3 & 4), through the stucco sheathing 18, the wire mesh 17, the building paper 16, the drip screed 19 (where applicable), and at least partially into the frame 10. A plurality of the holes 30 may be spaced about the frame 10. For example, the holes 30 may be uniformly spaced along the studs 11 and sill plate 12, 8 inches on center (i.e., a distance of 8 inches from the center of one drill hole to the center of another drill hole). The pilot holes may be disposed along studs forming the base structure, the base sill plates, the door jambs, the window jambs and other edges of the wall.

The holes 30 are preferably drilled by a stucco retrofit drill having drill bit attachments as described in Provisional Application No. 60/309,938 and co-pending U.S. patent application Ser. No. 10,211,810, the disclosures of which are incorporated herein by reference. A preferred application of the fastening device of the present invention is in retrofitting existing stucco sheathings along the sills, plates, edges and jambs of exterior walls.

In one embodiment, the retrofit drill provides a 3/16 inch diameter hole 30, which extends from an outer surface of the stucco sheathing 18 and at least partially into the frame 10. The fastener 20 likewise projects from the outer surface of the stucco sheathing 18 and at least partially into the frame 10. For example, in one embodiment, the fastener 20 extends into the frame 10, such that an entire axial length of the threaded portion 26 extends into the frame 10 and approximately ⅜ inch of the axial length of the shank 28 extends into the frame 10. In another embodiment, approximately ½ inch of the axial length of the shank 28 extends into the frame 10. When at least a portion of the shank 28 extends into the frame 10, lateral forces experienced by the stucco sheathing 18 are transferred from the stucco sheathing 18 to the building frame 10.

After the fastener 20 is engaged with the holes 30, the holes 30 may be filled with an epoxy enhanced stucco patch material 32, for example caulking. In addition, the outer surface of the stucco sheathing 18 may be coated with a color coat or a finishing layer of stucco 34. Alternatively, texture may be provided over the patch material 32 to match the finish of the outer surface of the stucco sheathing 18.

Figure 5:
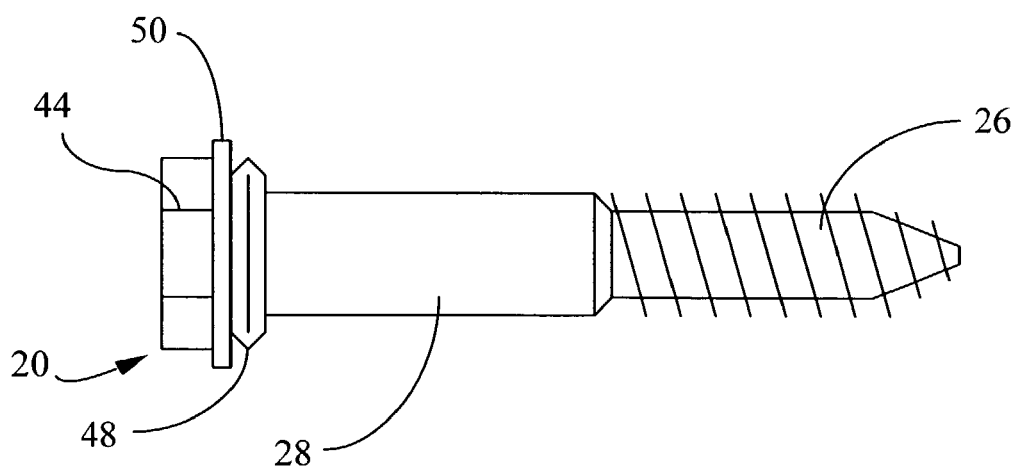
FIG. 5 is a side view of a second embodiment of a fastener of the present invention.

In an alternative embodiment, as shown FIG. 5, the fastener 20 comprises a pan-head portion 44 and a grommet 48. The grommet 48 seals the hole 30 when the fastener 20 is engaged with the hole 30. For example, when the hole 30 comprises a countersunk portion, the grommet 48 may be a similarly tapered, such that the grommet 48 forms a sealed section in the hole 30 when the fastener 20 is engaged with the hole 30. In one embodiment, the grommet 48 is comprised of an elastic material, such as a synthetic rubber material, for example neoprene. In such an embodiment, the grommet 48 forms a water tight sealed section in the hole 30 when the fastener 20 is engaged with the hole 30.

In addition, a washer 50 may be disposed between the head portion 44 and the grommet 48 to provide a bearing surface for urging the grommet 48 into sealing contact with the hole 30 when the fastener 20 is engaged with the hole 30. Although the grommet 48 has been described as used in conjunction with a pan-head screw, the grommet 48 may be used with other fasteners, such as screws having various other head configurations.

It is important to note that when retrofitting the fasteners 20 to existing stucco sheathings, the existing stucco sheathings should be initially investigated to confirm that they are in good enough condition to warrant reinforcing the existing stucco sheathings with the fasteners 20 to improve the lateral resistance of the existing stucco sheathings. In addition, it is also advisable when retrofitting the fasteners 20 to existing stucco sheathings to inspect the frame 10 for dry rot, fungus and/or termite damage or any other damage that would lessen the advantage of applying the fasteners 20 to the existing stucco sheathings.

It is preferred that the fasteners 20 be installed to exterior stucco sheathing prior to color coating. By this is it meant the color coating which typically occurs every 10 to 15 years, where the outer surface of existing stucco sheathings are provided with a thin new coat of stucco, such as the layer 34 described above. Installing the fasteners 20 prior to color coating may reduce the cost of maintenance of the stucco sheathing, as fasteners 20 may be retrofitted to the existing stucco sheathing around the same time when the color coating is applied.

Figure 4:
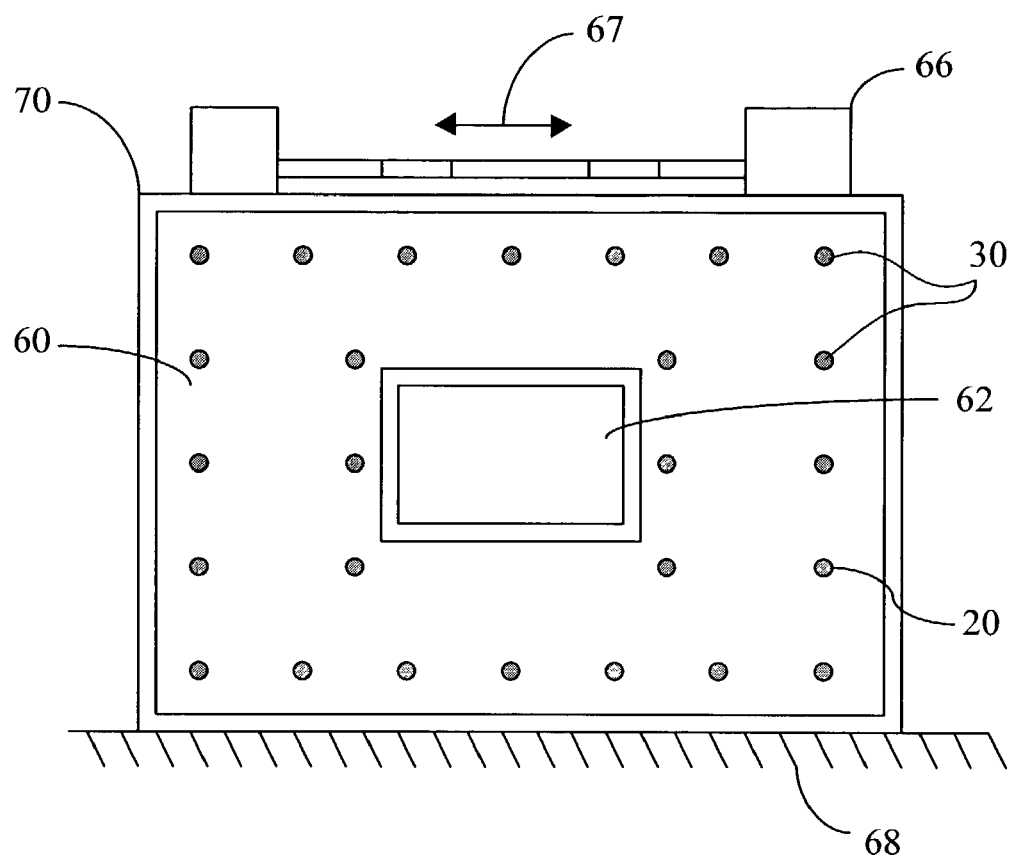
FIG. 4 is a side view depiction of a stucco panel used during lateral load testing.

Experimental testing to investigate the enhanced lateral strength of stucco sheathings 18 that have been reinforced with the fasteners 20 has been conducted. Referring now to FIG. 4, tests were conducted on a 10 foot by 8 foot high stucco panel 60 comprising a window 62 at its center. The fasteners 20 where disposed along the outer surface of the stucco panel 60 and into a framing structure as described above.

In addition, the stucco panel 60 was fixed to an apparatus 66 which anchored the panel 60 along its base 68, and provided lateral displacement (depicted by an arrow 67) of the panel 60 along its free standing end 70. The test revealed that the fasteners 20 increased the resistance of the stucco panel 60 from approximately 300 pounds per foot to approximately 700 pounds per foot.

In summary, the present invention provides an inexpensive device and method for improving a building structure's resistance to earthquake and/or hurricane forces. This reduces structural damage to the building structure's stucco sheathing, interior wall sheathing and prolongs the occupancy of wood framed residences.

The preceding description has been presented with reference to certain embodiments of the invention. Workers skilled in the art and technology to which this invention pertains will appreciate that alterations and changes in the described structure may be practiced without meaningfully departing from the principal, spirit and scope of the invention. Accordingly, the foregoing description should not be read as pertaining only to the precise structures described and illustrated in the accompanying drawings, but rather should be read consistent with and as support to the appended claims which are to have their fullest and fair scope.

What is claimed is:

1. A system for retrofitting stucco sheathing to improve resistance to seismic and other loading forces imposed on the sheathing comprising:
   a wood frame structure having stucco sheathing applied thereto:
   a fastener with a body portion having a predetermined axial length,
   a hexagonal head at one axial end of the body portion for being seated in a countersunk hole in the stucco sheathing;
   a screw threaded portion at an opposite axial end of the body and;
   an unthreaded shank portion extending between the hexagonal head and the threaded portion wherein the axial length of the unthreaded shank portion extends entirely through the stucco sheathing and between at least three-eighths (⅜") inches and one-half inch (½") into the wood frame structure whereby lateral forces imposed on the stucco sheathing are transferred from the sheathing to the wood frame structure and wherein the axial length of the unthreaded shank portion is approximately one and one-eighth inches (1⅛") in length and the entire axial length of the fastener is approximately two and one-quarter inches (2¼") in length and;
   wherein the fastener is comprised of a metal material that has been normalized to increase the ductility of the fastener and is capable of being screwed through the stucco sheathing and into the wood frame structure.

2. The system of claim 1 further comprising a grommet disposed in surrounding relation to an outer surface of the fastener body portion and seated under the screw head.

3. The system of claim 1, wherein the grommet is comprised of neoprene.

* * * * *